(12) United States Patent
Karino et al.

(10) Patent No.: US 10,555,217 B2
(45) Date of Patent: Feb. 4, 2020

(54) TERMINAL DEVICE, TERMINAL-DEVICE CONTROL METHOD, AND TERMINAL-DEVICE CONTROL PROGRAM

(71) Applicant: NEC Corporation, Tokyo (JP)

(72) Inventors: Shuichi Karino, Tokyo (JP); Yoshinori Saida, Tokyo (JP); Yoshikazu Watanabe, Tokyo (JP); Gen Morita, Tokyo (JP); Takahiro Iihoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 34 days.

(21) Appl. No.: 15/027,551

(22) PCT Filed: Sep. 3, 2014

(86) PCT No.: PCT/JP2014/004518
§ 371 (c)(1),
(2) Date: Apr. 6, 2016

(87) PCT Pub. No.: WO2015/052866
PCT Pub. Date: Apr. 16, 2015

(65) Prior Publication Data
US 2016/0242074 A1    Aug. 18, 2016

(30) Foreign Application Priority Data
Oct. 11, 2013   (JP) .................................. 2013-214024

(51) Int. Cl.
*H04L 12/26* (2006.01)
*H04W 28/10* (2009.01)
(Continued)

(52) U.S. Cl.
CPC ............. *H04W 28/10* (2013.01); *H04L 47/31* (2013.01); *H04M 1/67* (2013.01); *H04L 45/306* (2013.01); *H04W 88/02* (2013.01)

(58) Field of Classification Search
USPC ....... 370/229, 230, 235, 236, 252, 351, 357, 370/360, 392
See application file for complete search history.

(56) References Cited

U.S. PATENT DOCUMENTS 8,873,392 B1 * 10/2014 Orr ..................... H04L 47/2458
370/235
9,647,937 B1 * 5/2017 Dukes ..................... H04L 49/70
(Continued)

FOREIGN PATENT DOCUMENTS

JP    2008-191862 A    8/2008
JP    2008-546321 A    12/2008
(Continued)

OTHER PUBLICATIONS

International Search Report corresponding to PCT/JP2014/004518, 4 pages, dated Dec. 16, 2014.
(Continued)

*Primary Examiner* — Kwang B Yao
*Assistant Examiner* — Nguyen H Ngo
(74) *Attorney, Agent, or Firm* — Wilmer Cutler Pickering Hale and Dorr LLP

(57) ABSTRACT

To provide a terminal device capable of preventing user-unintended communication from being made. A communication control means 91 controls a packet transfer means for transmitting a packet. An instruction information giving means 92 gives instruction information indicating an instruction for the communication control means 91 to the communication control means 91. The communication control means 91 sends a flow detection notification that it detected a new flow to the instruction information giving means 92 when detecting the new flow. The instruction information giving means 92 determines whether to permit the flow to be communicated when receiving the flow detection notification. When determining to permit commu-
(Continued)

nication, the instruction information giving means 92 then gives instruction information for instructing to transmit a packet of the flow in a path as an access network designated by the instruction information giving means 92 to the communication control means 91.

9 Claims, 9 Drawing Sheets

(51) Int. Cl.
*H04M 1/67* (2006.01)
*H04L 12/833* (2013.01)
*H04L 12/725* (2013.01)
*H04W 88/02* (2009.01)

(56) References Cited

U.S. PATENT DOCUMENTS

| | | | |
|---|---|---|---|
| 2005/0220124 A1* | 10/2005 | Oguchi | H04L 47/10 370/400 |
| 2006/0274750 A1 | 12/2006 | Babbar et al. | |
| 2008/0031271 A1* | 2/2008 | Maeda | H04L 49/60 370/428 |
| 2011/0310901 A1* | 12/2011 | Uchida | H04L 43/026 370/392 |
| 2012/0099591 A1* | 4/2012 | Kotha | H04L 45/54 370/392 |
| 2012/0113989 A1* | 5/2012 | Akiyoshi | H04L 45/02 370/392 |
| 2012/0314605 A1* | 12/2012 | Akiyoshi | H04L 45/30 370/252 |
| 2013/0329601 A1* | 12/2013 | Yin | H04L 45/02 370/254 |
| 2014/0089506 A1* | 3/2014 | Puttaswamy Naga | H04L 45/42 709/225 |
| 2014/0198798 A1* | 7/2014 | Akiyoshi | H04W 76/02 370/392 |
| 2015/0026794 A1* | 1/2015 | Zuk | H04L 45/64 726/13 |
| 2015/0043574 A1* | 2/2015 | Akiyoshi | H04L 45/38 370/389 |
| 2015/0043587 A1* | 2/2015 | Uchida | H04L 41/00 370/392 |
| 2015/0089032 A1* | 3/2015 | Agarwal | H04L 41/0816 709/221 |
| 2015/0304216 A1* | 10/2015 | Suzuki | H04L 45/16 370/390 |

FOREIGN PATENT DOCUMENTS

| | | |
|---|---|---|
| JP | 2009-177262 A | 8/2009 |
| WO | WO-2012-077603 A1 | 6/2012 |
| WO | WO-2014-038135 A1 | 3/2014 |

OTHER PUBLICATIONS

OpenFlow Switch Specification Version 1.0.0 (Wire Protocol 0x01), Dec. 31, 2009, [searched on Sep. 20, 2013], the Internet <http://www.openflow.org/documents/openflow-spec-v1.0.0.pdf>, pp. 1-42.

* cited by examiner

FIG. 2

| ITEM | FIELD | MEANING |
|---|---|---|
| SEARCH KEY | POLICY ID | IDENTIFIER OF POLICY |
| | PRIORITY | PRIORITY OF POLICY |
| | APPLICATION ID | IDENTIFIER OF APPLICATION FOR EXCHANGING TRAFFIC TO BE CONTROLLED WITHIN TERMINAL DEVICE (IF NOT DESIGNATED, REGARDED AS WILD CARD) |
| | FLOW IDENTIFICATION INFORMATION | IDENTIFICATION INFORMATION ON FLOW OF TRAFFIC TO BE CONTROLLED (SUCH AS ADDRESS AND PORT NUMBER) (IF NOT DESIGNATED, REGARDED AS WILD CARD) |
| ACTION | PATH DESIGNATION | DESIGNATE ACCESS NETWORK TO WHICH TERMINAL DEVICE IS CONNECTABLE |
| | FLAG DESIGNATION | DESIGNATE FLAG CORRESPONDING TO VARIOUS OPERATIONS |

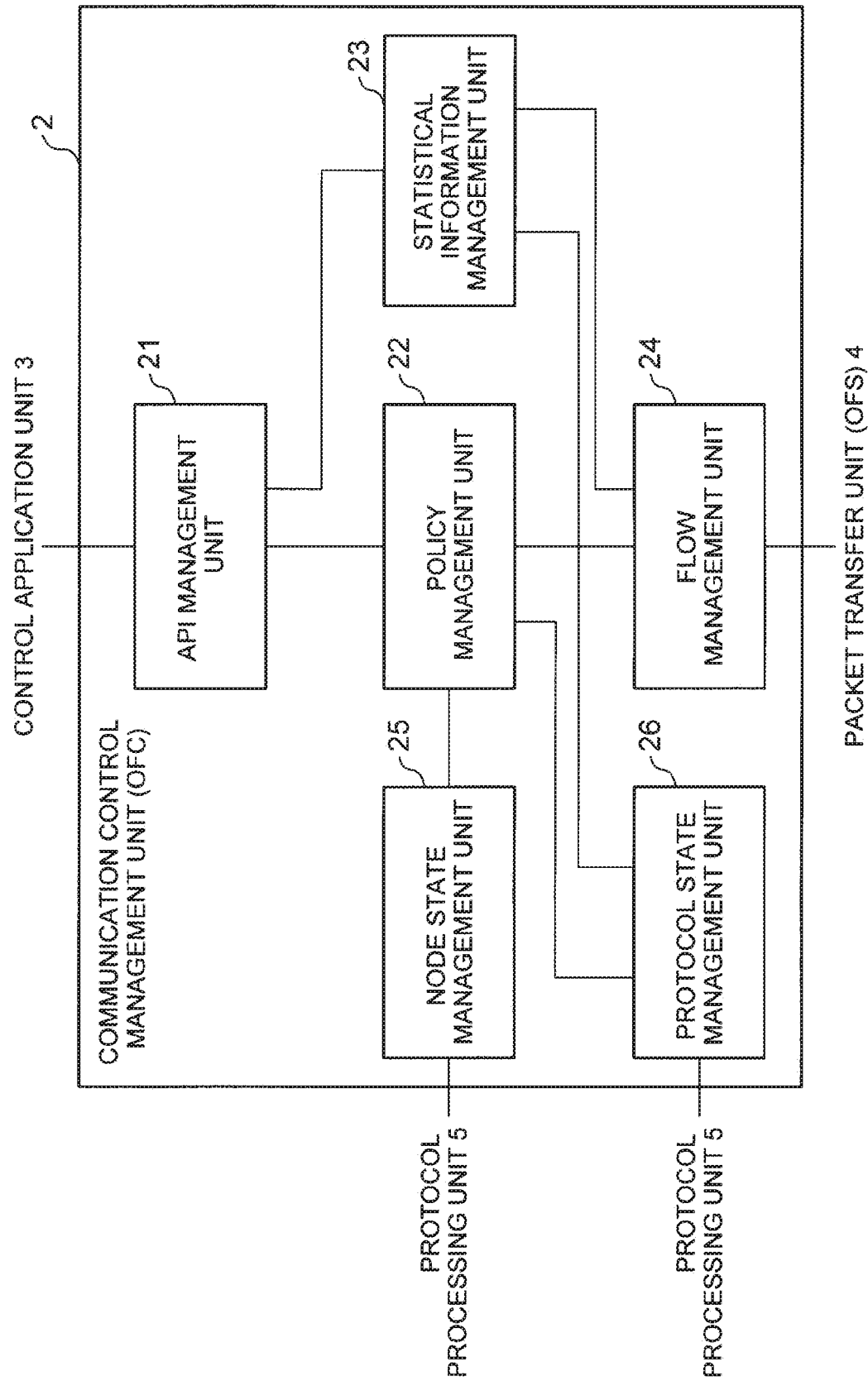

FIG. 4

| ITEM | FIELD | MEANING |
|---|---|---|
| SEARCH KEY | FLOW IDENTIFICATION INFORMATION | IDENTIFICATION INFORMATION ON FLOW OF TRAFFIC TO BE CONTROLLED (SUCH AS ADDRESS AND PORT NUMBER) (IF NOT DESIGNATED, REGARDED AS WILD CARD) |
| | POLICY ID | POLICY ID USED FOR SETTING FLOW ENTRY |
| VALUE | ACTION | ACTION SET FOR FLOW ENTRY |

TERMINAL DEVICE, TERMINAL-DEVICE CONTROL METHOD, AND TERMINAL-DEVICE CONTROL PROGRAM

CROSS-REFERENCE TO RELATED APPLICATIONS

This application is a national stage application of International Application No. PCT/JP2014/004518 entitled "TERMINAL DEVICE, TERMINAL-DEVICE CONTROL METHOD, AND TERMINAL-DEVICE CONTROL PROGRAM," filed on Sep. 3, 2014, which claims the benefit of the priority of Japanese Patent Application No. 2013-214024 filed on Oct. 11, 2013, the disclosures of each of which are hereby incorporated by reference in their entirety.

TECHNICAL FIELD

The present invention relates to a terminal device capable of making communication with the outside, a terminal-device control method for controlling the terminal device, and a terminal-device control program for controlling the terminal device.

BACKGROUND ART

OpenFlow is known as a protocol with which a control device controls a packet transfer switch. OpenFlow is defined in Non-Patent Literature 1.

With OpenFlow, the control device sets a flow entry for the switch. The switch then processes a received packet according to the flow entry. A flow entry is information defining how to process (such as transfer or drop) a packet therein. A flow entry is set per packet flow. If a flow entry corresponding to a flow of a packet is present when the switch receives the packet, the switch processes the packet according to the flow entry. On the other hand, when a flow entry corresponding to a flow of the received packet is not present, the switch notifies the fact to the control device. The control device then determines a flow entry corresponding to the packet flow and sets it for the switch.

There are exemplary messages exchanged between the control device and the switch with OpenFlow, such as "Packet_in," "Flow_mod," "Packet_out," and "Flow_removed."

"Packet_in" is a message sent from the switch to the control device. "Packet_in" is used for sending a packet of which corresponding flow entry is not present from the switch to the control device.

"Flow_mod" is a message sent from the control device to the switch. "Flow_mod" is a message for adding, changing or deleting a flow entry from the control device to the switch.

"Packet_out" is a message sent from the control device to the switch. "Packet_out" is a message for instructing to output a packet from a port.

"Flow_removed" is a message sent from the switch to the control device. "Flow_removed" is a message for, when a flow entry is not used for a certain period of time and is erased from the switch due to time-out, notifying the fact to the control device. When transmitting "Flow_removed," the switch transmits statistical information on a flow corresponding to the erased flow entry to the control device.

Further, Patent Literature 1 describes an OpenFlow-applied system therein. It describes that when verifying an unauthorized address faking a transmission source Media Access Control (MAC) address or Internet Protocol (IP) address and detecting falsification, the control device sets a flow entry which is not permitted to transfer a packet for the switch.

CITATION LIST

Patent Literature

PTL 1: Pamphlet of International Publication No. WO 2012/077603 (paragraph 0058)

Non Patent Literature

NPL 1: "OpenFlow Switch Specification Version 1.0.0 (Wire Protocol 0x01)," Dec. 31, 2009. [searched on Sep. 20, 2013], Internet <http://www.openflow.org/documents/openflow-spec-v1.0.0.pdf>

SUMMARY OF INVENTION

Technical Problem

In recent years, Smartphones and the like have been rapidly and widely used as terminal devices capable of making communications with the outside. The terminal devices make communication according to various installed applications. However, user-unintended communication may be contained in the communications. For example, an application faking a communication-impossible application (such as battery saving application) is installed and the application can transmit user information to the outside. Further, the terminal devices do not have a general-purpose means for recognizing ongoing communication and realizing communication control based on the recognition result. Thus, user-unintended communication can be made as described above.

Therefore an objective of the present invention is to provide a terminal device capable of preventing user-unintended communication from being made, a terminal-device control method, and a terminal-device control program.

Solution to Problem

A terminal device of the present invention includes: a communication control means for controlling a packet transfer means for transmitting a packet; and an instruction information giving means for giving instruction information indicating an instruction for the communication control means to the communication control means, and the communication control means sends a flow detection notification that it detected a new flow to the instruction information giving means when detecting the new flow, and the instruction information giving means determines whether to permit the flow to be communicated when receiving the flow detection notification, and when determining to permit communication, gives instruction information for instructing to transmit a packet of the flow in a path as an access network designated by the instruction information giving means to the communication control means.

Further, a terminal-device control method of the present invention includes: by a communication control means, controlling a packet transfer means for transmitting a packet; by an instruction information giving means, giving instruction information indicating an instruction for the communication control means to the communication control means; by the communication control means, sending a flow detection notification that it detected a new flow to the instruction information giving means when detecting the new flow; and by the instruction information giving means, determining whether to permit the flow to be communicated when receiving the flow detection notification, and when determining to permit communication, giving instruction information for instructing to transmit a packet of the flow in a path as an access network designated by the instruction information giving means to the communication control means.

Further, a terminal-device control program of the present invention is mounted on a computer used as a terminal device, and includes a communication control means for controlling a packet transfer means for transmitting a packet and an instruction information giving means for giving instruction information indicating an instruction for the communication control means to the communication control means, and the program causes the computer to perform: a flow detection notification processing of, when the communication control means detects a new flow, sending a flow detection notification that the new flow is detected to the instruction information giving means; and an instruction information giving processing of, when the instruction information giving means determines whether to permit the flow to be communicated when receiving the flow detection notification, and determines to permit communication, giving instruction information for instructing to transmit a packet of the flow in a path as an access network designated by the instruction information giving means to the communication control means.

Advantageous Effects of Invention

According to the present invention, it is possible to prevent user-unintended communication from being made.

BRIEF DESCRIPTION OF DRAWINGS

FIG. 2 It depicts an explanatory diagram schematically illustrating a policy.
FIG. 3 It depicts a block diagram illustrating an OFC in detail.
FIG. 4 It depicts a schematic diagram illustrating exemplary information managed by a flow management unit.

DESCRIPTION OF EMBODIMENTS

An exemplary embodiment of the present invention will be described below with reference to the drawings. A control device with OpenFlow will be denoted as OpenFlow controller (OFC) below. Further, a switch with OpenFlow will be denoted as OpenFlow Switch (OFS).

Figure 1:
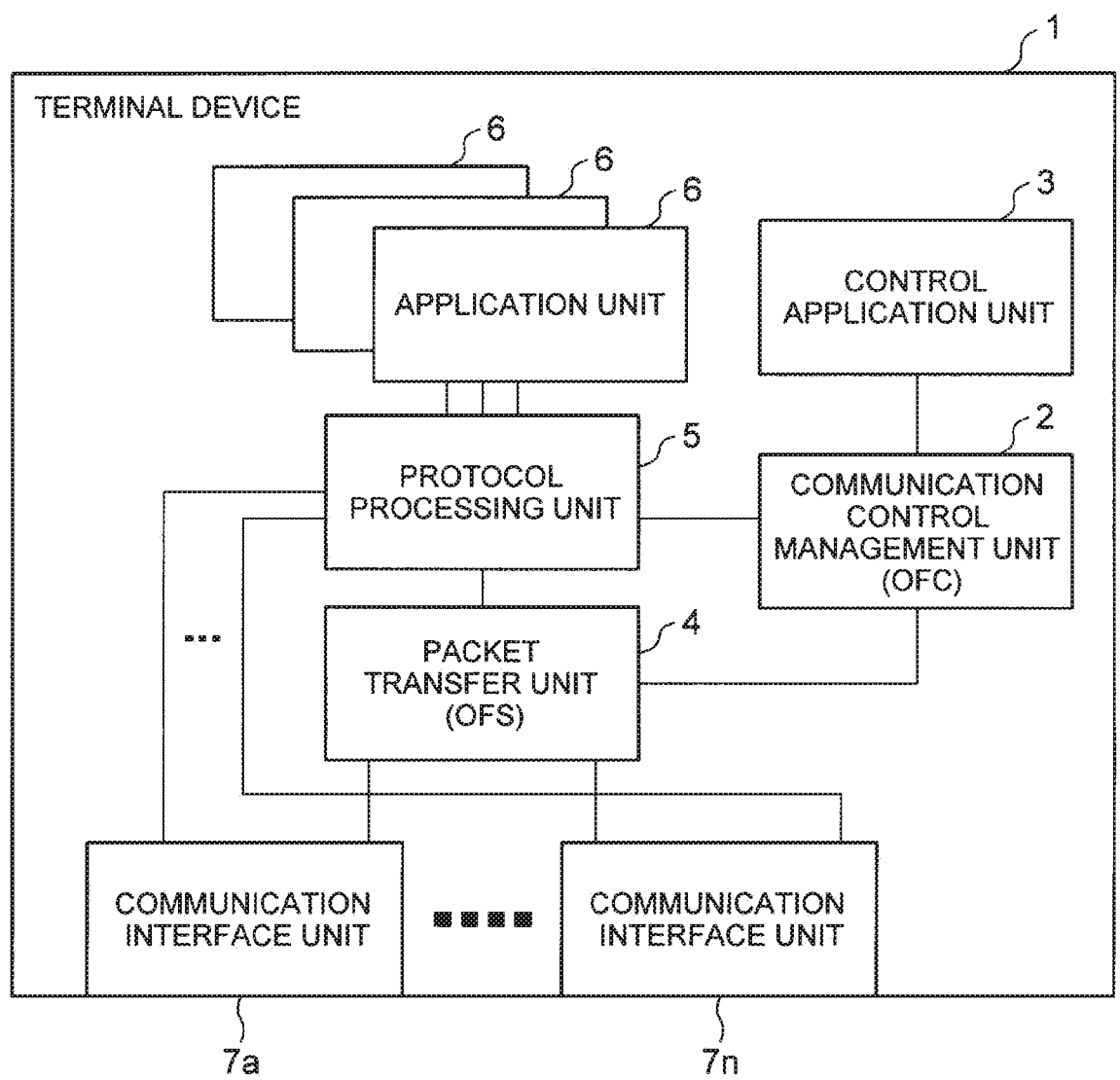
FIG. 1 It depicts a block diagram illustrating an exemplary terminal device according to the present invention.

FIG. 1 is a block diagram illustrating an exemplary terminal device according to the present invention. A terminal device 1 according to the present invention is a Smartphone or tablet terminal device, for example, but is not limited thereto. The terminal device 1 according to the present invention includes a communication control management unit 2, a control application unit 3, a packet transfer unit 4, a protocol processing unit 5, application units 6, and communication interface units 7a to 7n.

Each application unit 6 is realized by the CPU operating according to each application software (which will be simply denoted as application below) installed in the terminal device 1. Each application unit 6 operates according to a corresponding application.

The packet transfer unit 4 processes (such as transfers or drops) packets to be transmitted by the application units 6 to the outside according to the communication control management unit 2.

The communication control management unit 2 controls the packet processing in the packet transfer unit 4 based on an instruction from the control application unit 3. The present exemplary embodiment will be described assuming that the communication control management unit 2 controls the packet transfer unit 4 according to OpenFlow. That is, the present exemplary embodiment will be described assuming that the communication control management unit 2 corresponds to the OpenFlow OFC and the packet transfer unit 4 corresponds to the OpenFlow OFS. The communication control management unit 2 may control the packet transfer unit 4 with a protocol other than OpenFlow. The communication control management unit 2 will be denoted as OFC 2 below. The packet transfer unit 4 will be denoted as OFS 4. The OFC 2 and the OFS 4 are realized by the CPU operating according to a program. The program for realizing the functions of the OFC 2 will be called OFC infrastructure.

The control application unit 3 is realized by the CPU operating according to control application software. Control application software will be denoted as control application below. The control application unit 3 sends instruction information on instructions for the OFC 2 to the OFC 2. The instruction information will be denoted as policy.

The communication interface units 7a to 7n are communication interfaces corresponding to various communications such as 3rd generation (3G), Long Term Evolution (LTE), and Wireless Fidelity (Wi-Fi, trademark). Each communication interface unit 7a to 7n is specifically identified as a port of the OFS 2.

The protocol processing unit 5 is realized by the CPU operating according to a program. The protocol processing unit 5 provides an application with a communication service. The protocol processing unit 5 is mounted with a protocol such as Transmission Control Protocol (TCP) or User Datagram Protocol (UDP) used in transmission path. The protocol processing unit 5 monitors whether each communication interface unit 7a to 7n is available, and notifies the monitoring result to the OFC 2 (specifically, a node state management unit 25 described later, see FIG. 3). Further, the protocol processing unit 5 notifies its port number and a process identification (ID) corresponding to the port number to the OFC 2 (specifically, a protocol state management unit 26 described later, see FIG. 3). The port number is a port number of TCP or UDP in each communication instructed by an application.

Each program for realizing the functions of the control application as well as the OFC 2, the OFS 4, and the protocol processing unit 5 may be called terminal-device control program. The terminal-device control program is stored in a storage device (not illustrated) in the terminal device 1, and the CPU in the terminal device 1 reads the terminal-device control program to operate as the OFC 2, the control application unit 3, the OFS 4, or the protocol processing unit 5 according to the program.

A policy sent from the control application unit 3 to the OFC 2 will be described. The policy is instruction information for designating an action depending on the contents of traffic. FIG. 2 is an explanatory diagram schematically illustrating a policy. A policy includes a search key used for searching a policy, and actions indicating the operations designated by the policy.

The information for designating traffic is described as a search key. For example, an application ID is described as a search key. The application ID is the identification of an application for exchanging traffic to be controlled within the terminal device. When the application ID is not designated in the policy, it is considered as wild card.

Further, for example, flow identification information on traffic to be controlled may be described as a search key. The flow identification information includes address, port number, and the like, for example. When the flow information such as address or port number is not designated, it is considered as wild card.

The search key may include a priority. When a plurality of policies are present for a common traffic, the priority indicates a priority of a policy. Therefore, when the OFC 2 searches a policy corresponding to traffic and finds a plurality of policies, the OFC 2 finally assumes only a policy with the highest priority among the policies as a search result.

The search key includes a policy ID as the identifier of the policy.

A way to designate an action may be a way to designate a path of traffic according to the traffic. With the way, an access network (such as Wi-Fi or 3G) to which the terminal device can connect is designated. For example, when Wi-Fi is designated as an action in a policy corresponding to traffic, a packet of the traffic is to be transmitted from a communication interface unit corresponding to Wi-Fi.

A way to designate an action may be a way to define whether to perform a previously-defined operation depending on a flag. An exemplary previously-defined operation may be an operation that "when the OFC 2 detects a new flow meeting the condition designated in the policy, the OFC 2 notifies the transmission source application and the destination of the new flow to the control application unit 3," for example. It is assumed that a flag corresponding to the operation is set ON in the policy. When the OFC 2 detects a new traffic (more specifically, a new flow meeting the designated condition) and searches the policy as a policy corresponding to the traffic, it performs the operation designated by the flag. When the flag is set OFF in the policy, the OFC 2 does not perform the operation even if it has searched the policy.

The policy may describe a plurality of actions therein.

Further, an application corresponding to the application unit 6 transmitting a packet to the OFS 4 is denoted as packet transmission source application.

According to the present invention, when detecting a packet of traffic designated in a policy, the OFC 2 notifies the information on the transmission source application and the destination of the packet to the control application unit 3 according to the policy. The control application unit 3 transmits the information notified from the OFC 2 to the user of the terminal device 1, for example. Then, when the user is permitted to make communication, the control application unit 3 transmits, to the OFC 2, the policy of transmitting a packet of the traffic to the user-designated access network. On the other hand, when the user is not permitted to make communication, the control application unit 3 sends, to the OFC 2, the policy of dropping a packets of the traffic. The present invention is characterized by the operations of the control application unit 3 for the OFC 2 and the operations of the OFC 2 for the control application unit 3. In other words, the present invention is characterized by Northbound Application programming Interface (API) between the control application unit 3 and the OFC 2. The characteristics of the present invention can cause an effect that user-unintended communication can be prevented from being made. There has been described herein the case in which the control application unit 3 receives an instruction to or not to permit communication from the user, but the control application unit 3 may determine whether or not to permit communication according to the contents defined by Mobile Device Management (MDM), for example.

FIG. 3 is a block diagram illustrating the OFC 2 in detail. The OFC 2 includes an API management unit 21, a policy management unit 22, a statistical information management unit 23, a flow management unit 24, the node state management unit 25, and the protocol state management unit 26.

The API management unit 21 relays API calls from the control application unit 3 or responses from the OFC 2. For example, when receiving a notification to add, change or delete a policy from the control application unit 3, the API management unit 21 sends the notification to the policy management unit 22. When the policy management unit 22 transmits information to the control application unit 3, the API management unit 21 relays the information. Further, for example, when receiving a request for the statistical information of traffic from the control application unit 3, the API management unit 21 sends the request to the statistical information management unit 23. When the statistical information management unit 23 then sends the statistical information to the control application unit 3 in response to the request, the API management unit 21 relays the statistical information.

The policy management unit 22 holds each policy sent from the control application unit 3.

Further, when acquiring a packet with "Packet_in" from the OFS 4 to the OFC 2 (a packet for which a matching flow entry is not present in the OFS 4), the policy management unit 22 searches a policy depending on the packet, and performs an operation defined by the searched policy. More specifically, when receiving a packet with "Packet_in" from the OFS 4 to the OFC 2, the flow management unit 24 sends the packet to the policy management unit 22 and requests the same to search a policy. In the following description, the operation may be called policy inquiry. The policy management unit 22 searches a policy in response to the request, and performs an operation defined by the searched policy. At this time, when an action of designating an access network is described in the policy acquired by the searching, the policy management unit 22 returns the action and the policy ID to the flow management unit 24 thereby to instruct the flow management unit 24 to create a flow entry.

The statistical information management unit 23 holds statistical information sent from the OFS 4.

The flow management unit 24 makes communication with the OFS 4, and manages information on a flow entry set in the OFS 4. When receiving a packet with "Packet_in" from the OFS 4 (a packet for which a matching flow entry is not present in the OFS 4), the flow management unit 24 sends the packet to the policy management unit 22 and requests the same to search a policy. When receiving an action of designating an access network and a policy ID from the policy management unit 22 in response thereto, the flow management unit 24 creates a flow entry based on the action and the packet flow information, and transmits the flow entry to the OFS 4. The flow management unit 24 then manages information on the flow entry.

FIG. 4 is a schematic diagram illustrating exemplary information managed by the flow management unit 24. The flow management unit 24 creates and holds information illustrated in FIG. 4 per flow entry. Then, each item of information managed by the flow management unit 24 includes a search key for searching an individual item of information. The search key describes flow identification information on traffic controlled by the flow entry therein. As described above, the flow identification information includes address, port number, and the like, for example. When the flow information such as address or port number is not designated, it is considered as wild card. Further, the search key includes a policy ID used for setting a flow entry. Further, each item of information management by the flow management unit 24 describes an action set in the flow entry.

Further, when receiving "Flow_removed," the flow management unit 24 sends statistical information with "Flow_removed" received from the OFS 4 to the statistical information management unit 23. As illustrated in FIG. 4, a flow entry is associated with a policy ID, and thus even when statistical information on an erased flow is sent from the OFS 4, the statistical information management unit 23 can recognize which application the statistical information corresponds to.

The node state management unit 25 acquires and holds information on whether each communication interface unit 7a to 7n (see FIG. 1) is available from the protocol processing unit 5. The policy management unit 22 (specifically, an action selection unit 224 described later, see FIG. 5) determines whether an individual communication interface unit 7a to 7n is available with reference to the information. When a communication interface unit to send a packet is not available, the policy management unit 22 (specifically, the action selection unit 224) does not send an action to the flow management unit 24 even if the action of designating an access network corresponding to the communication interface unit is described in the searched policy. Consequently, a flow entry for sending a packet from the unavailable communication interface unit is not created.

The protocol state management unit 26 holds information on a correspondence between flow information on a packet and the application ID (application identifier) of the transmission source application of the packet. In the present example, there will be assumed an example that flow information of a packet employs its port number. The protocol state management unit 26 acquires the port number and the process ID from the protocol processing unit 5 (see FIG. 1). The protocol state management unit 26 creates information in which a User ID (UID) corresponding to the process ID is associated with an application ID corresponding to the UID, and holds the information. Consequently, the flow information (its port number) is associated with the application ID so that the application ID can be searched based on the flow information. The way the protocol state management unit 26 holds the information indicating a correspondence between flow information and application ID is not particularly limited, and may not be the above way.

Figure 5:
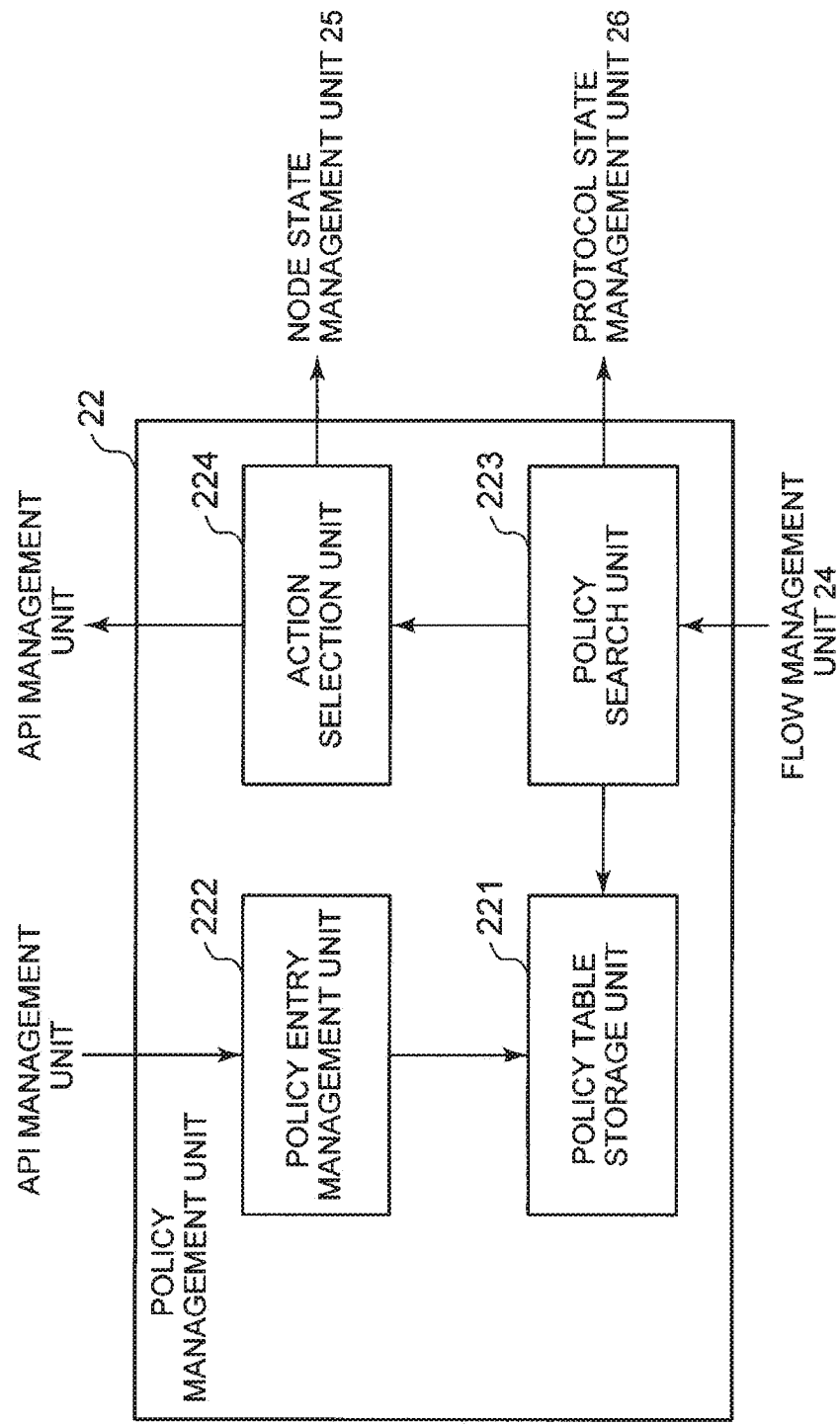
FIG. 5 It depicts a block diagram illustrating a policy management unit in detail.

FIG. 5 is a block diagram illustrating the policy management unit 22 in detail. The policy management unit 22 includes a policy table storage unit 221, a policy entry management unit 222, a policy search unit 223, and the action selection unit 224.

The policy table storage unit 221 is a storage device (such as memory) for storing policies therein.

When receiving a notification to add, change or delete a policy from the control application unit 3 via the API management unit 21, the policy entry management unit 222 updates the policies in the policy table storage unit 221 according to the notification. For example, the policy entry management unit 222 newly stores a policy in the policy table storage unit 221, changes the contents of the policies stored in the policy table storage unit 221, or deletes a policy stored in the policy table storage unit 221.

When being sent a packet from the flow management unit 24, the policy search unit 223 causes the protocol state management unit 26 to search an application ID corresponding to flow information with the flow information (port number in the present example) of the packet as a key. The protocol state management unit 26 returns the searched application ID to the policy search unit 223. The application ID is a transmission source application ID of the packet. The policy search unit 223 searches a policy from the policy table storage unit 221 with the application ID and the flow information of the packet sent from the flow management unit 24 as a key.

The action selection unit 224 selects an action defined in the policy searched by the policy search unit 223. For example, when an action of making a flow detection notification is defined in the policy searched by the policy search unit 223, the action selection unit 224 makes a flow detection notification to the control application unit 3. Further, for example, when an action of designating an access network is described in the policy, the action selection unit 224 returns the action and the policy ID to the flow management unit 24, and thus instructs the flow management unit 24 to create a flow entry.

Figure 6:
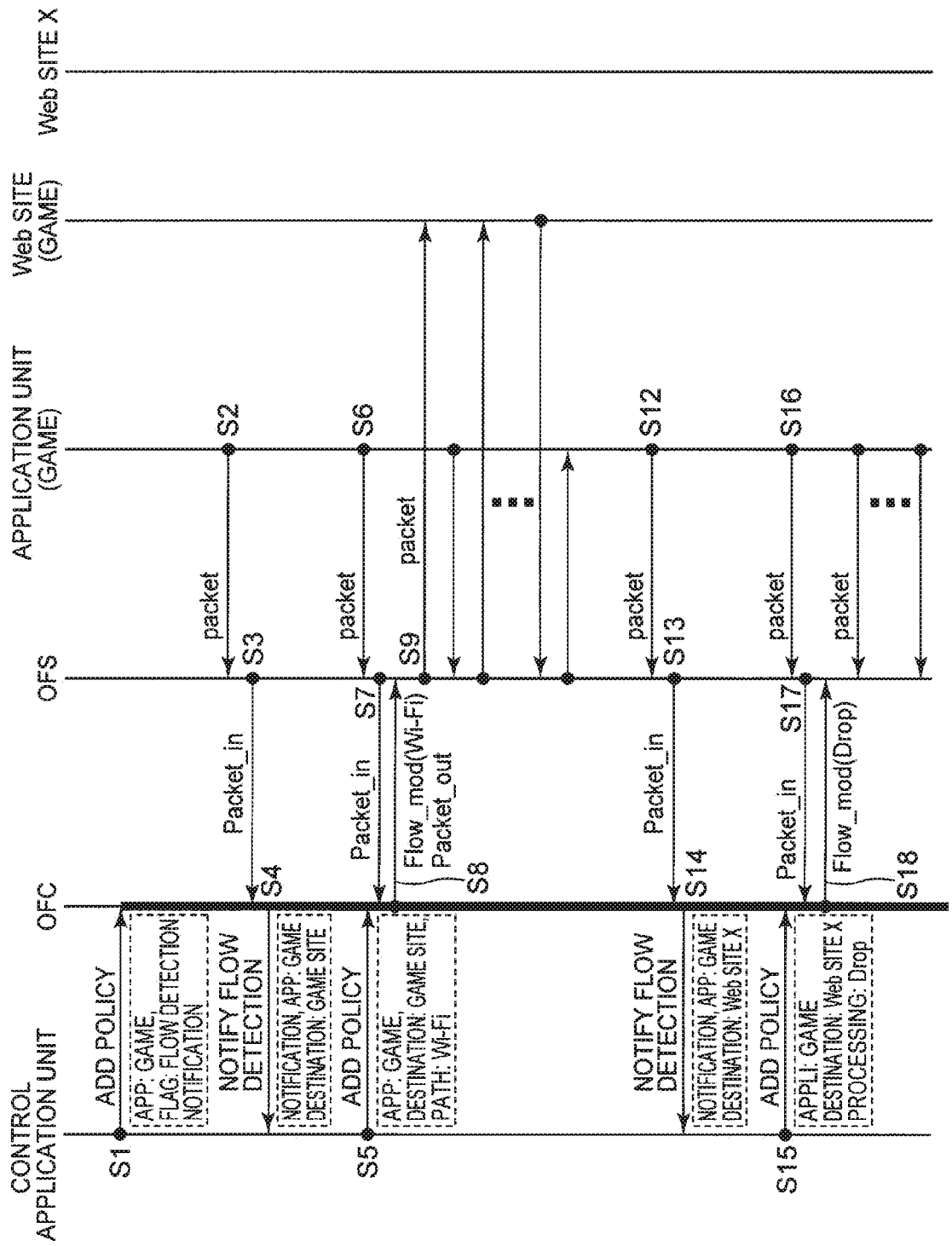
FIG. 6 It depicts a sequence diagram illustrating an exemplary processing progress according to the present invention.

The operations according to the present invention will be described below. FIG. 6 is a sequence diagram illustrating an exemplary processing progress of the present invention. In FIG. 6, APP indicates an application. In FIG. 6, the contents of the policies sent from the control application unit 3 to the OFC 2 and the contents of the flow detection notifications sent from the OFC 2 to the control application unit 3 are illustrated in dashed lines.

At first, the control application unit 3 instructs the OFC 2 to make a flow detection notification that "when the OFC 2 detects a new flow meeting the condition designated in the policy, the OFC 2 notifies the transmission source application and the destination of the new flow to the control application unit 3," and to add the policy defining the condition (step S1). The OFC 2 holds the policy. The control application unit 3 may set the flag corresponding to the flow detection notification ON. The following description will be made assuming that the control application unit 3 designates the application ID of the transmission source application as the condition of the flow detection notification in the search key of the policy sent from the control application unit 3 to the OFC 2 in step S1. Further, in the present example, the description will be made assuming that the application ID of a game application is designated as application ID.

The control application unit 3 may create the policy based on the user-input information or crate the policy based on the contents defined by the MDM.

The application unit 6 corresponding to the game application designated in the policy is assumed to transmit a packet destined for a game site (game Web site) to the OFS 4 (step S2).

In step S2, a flow entry corresponding to the flow of the packet is not stored in the OFS 4. Therefore, the OFS 4 transmits the packet to the OFC 2 via "Packet_in" (step S3).

The OFC 2 detects a new flow in response to the received "Packet_in." The OFC 2 then searches a policy corresponding to the new flow. Herein, the policy acquired in step S1 is acquired as a search result. The OFC 2 makes a flow detection notification according to the policy. That is, the OFC 2 notifies the transmission source application (game application) of the new flow and the destination (game site) of the new flow to the control application unit 3 (step S4).

The control application unit 3 determines whether to permit communication in the new flow in response to the flow detection notification received in step S4. The control application unit 3 then instructs the OFC 2 to add a policy depending on the determination result. A method for determining whether to permit communication in the new flow is not particularly limited. For example, the control application unit 3 may display the transmission source application of the new flow and the destination Web site thereof on a display unit (not illustrated) in the terminal device 1, and may be designated by the user as to whether to permit communication in the new flow. That is, the control application unit 3 may determine whether to permit communication according to user's determination. In this case, the control application unit 3 is designated an access network as communication path by the user, for example. Further, the control application unit 3 may determine whether to permit communication according to the contents previously defined in the MDM. In this case, an access network used for permitting communication may be defined in the MDM.

The description will be made herein assuming that the control application unit 3 permits communication in a new flow and the communication path is Wi-Fi. The control application unit 3 creates a policy of transmitting the flow corresponding to the transmission source (game application) and the destination (game site) notified in step S4 via Wi-Fi, and instructs the OFC 2 to add the policy (step S5). The control application unit 3 makes the priority of the policy created in step S5 higher than the priority of the policy created in step S1. The OFC 2 newly holds a policy in response to an instruction from the control application unit 3.

Further, the application unit 6 corresponding to a game application transmits a packet destined for a game site to the OFS 4 also after step S2 (step S6). Also in step S6, a flow entry corresponding to the flow of the packet is not stored in the OFS 4. Therefore, the OFS 4 transmits the packet to the OFC 2 via "Packet_in" (step S7).

The packet received by the OFC 2 in step S7 has the transmission source of a game application and the destination of a game site. The OFC 2 searches the policy acquired in step S5 as a policy corresponding to the flow information of the packet. The policy acquired in step S1 is also searched but the priority of the policy acquired in step S5 is higher. Therefore, the OFC 2 assumes the policy acquired in step S5 as a search result. The OFC 2 then creates a flow entry based on the searched policy. That is, the OFC 2 defines a flow entry defining that the flow of the packet with "Packet_in" received from the OFS 4 in step S7 is transmitted from the communication interface unit via Wi-Fi, and sends it to the OFS 4 (step S8). The OFS 4 then stores the flow entry. In step S8, specifically, the OFC 2 sends "Flow_mod (Wi-Fi)" and "Packet_out" to the OFS 4.

The OFS 4 transmits the packet destined for a game site received from the application unit 6 from the communication interface unit via Wi-Fi according to the flow entry (step S9). Consequently, the packet is transmitted to the game site.

Until the OFC 2 sets the flow entry for the OFS 4 in step S8, even if the application unit 6 corresponding to a game application sends the packet destined for a game site to the OFS 4, the packet is not transmitted to the game site. That is, until the flow entry is set in step S8, the packet destined for a game site with the transmission source of a game application is not communicated.

Then, in step S8, after the flow entry is set in the OFS 4, the OFS 4 transmits the packet destined for a game site received from the application unit 6 corresponding to a game application from the communication interface unit via Wi-Fi according to the flow entry.

It is assumed that the application unit 6 corresponding to a game application transmits a packet destined for a site other than game sites (which will be denoted as Web site X below) to the OFS 4 (step S12). A flow entry corresponding to the flow of the packet is not stored in the OFS 4. Therefore, the OFS 4 transmits the packet with "Packet_in" to the OFC 2 (step S13).

The OFC 2 receives "Packet_in" thereby to detect a new flow. The OFC 2 then searches a policy corresponding to the new flow. Herein, the policy acquired in step S1 is acquired as a search result. For the policy acquired in step S5, the destination as a search key does not match with the destination of the new flow, and thus the policy acquired in step S5 is not searched.

The OFC 2 makes a flow detection notification according to the policy. That is, the OFC 2 notifies the transmission source application (game application) of the new flow and the destination (Web site X) of the new flow to the control application unit 3 (step S14).

The control application unit 3 determines whether to permit communication in the new flow in response to the flow detection notification received in step S14, and sends the policy depending on the determination result to the OFC 2. The description will be made herein assuming that the control application unit 3 does not permit communication in the new flow. For example, it is assumed that the transmission source application of the new flow and the destination Web site are displayed on the display unit (not illustrated) in the terminal device 1. It is then assumed that the destination is a user-unintended Web site and thus unpermitted communication in the new flow is designated.

The control application unit 3 creates a policy of dropping the packet for the flow corresponding to the transmission source (game application) and the destination (Web site X) notified in step S14, and instructs the OFC 2 to add the policy (step S15). The control application unit 3 makes the priority of the policy created in step S15 higher than the priority of the policy created in step S1. The OFC 2 newly holds a policy in response to an instruction from the control application unit 3.

Further, the application unit 6 corresponding to a game application transmits a packet destined for a Web site X to the OFS 4 also after step S12 (step S16). Also in step S16, a flow entry corresponding to the flow of the packet is not stored in the OFS 4. Therefore, the OFS 4 transmits the packet with "Packet_in" to the OFC 2 (step S17).

The packet received by the OFC 2 in step S17 has the transmission source of a game application and the destination of a Web site X. The OFC 2 searches the policy acquired in step S15 as a policy corresponding to the flow information of the packet. The policy acquired in step S1 is also searched, but the priority of the policy acquired in step S15 is higher. Therefore, the OFC 2 assumes the policy acquired in step S15 as a search result. The OFC 2 then creates a flow entry based on the searched policy. That is, the OFC 2 defines a flow entry of dropping the flow of the packet with "Packet_in" received from the OFS 4 in step S17, and sends it to the OFS 4 (step S18). The OFS 4 then stores the flow entry. In step S18, specifically, the OFC 2 sends "Flow_mod (Drop)" to the OFS 4.

The OFS 4 drops the packet destined for a Web site X received from the application unit 6 according to the flow entry. Subsequently, when receiving a packet destined for a Web site X from the application unit 6 corresponding to a game application, the OFS 4 drops the packet according to the flow entry set in step S18.

Figure 7:
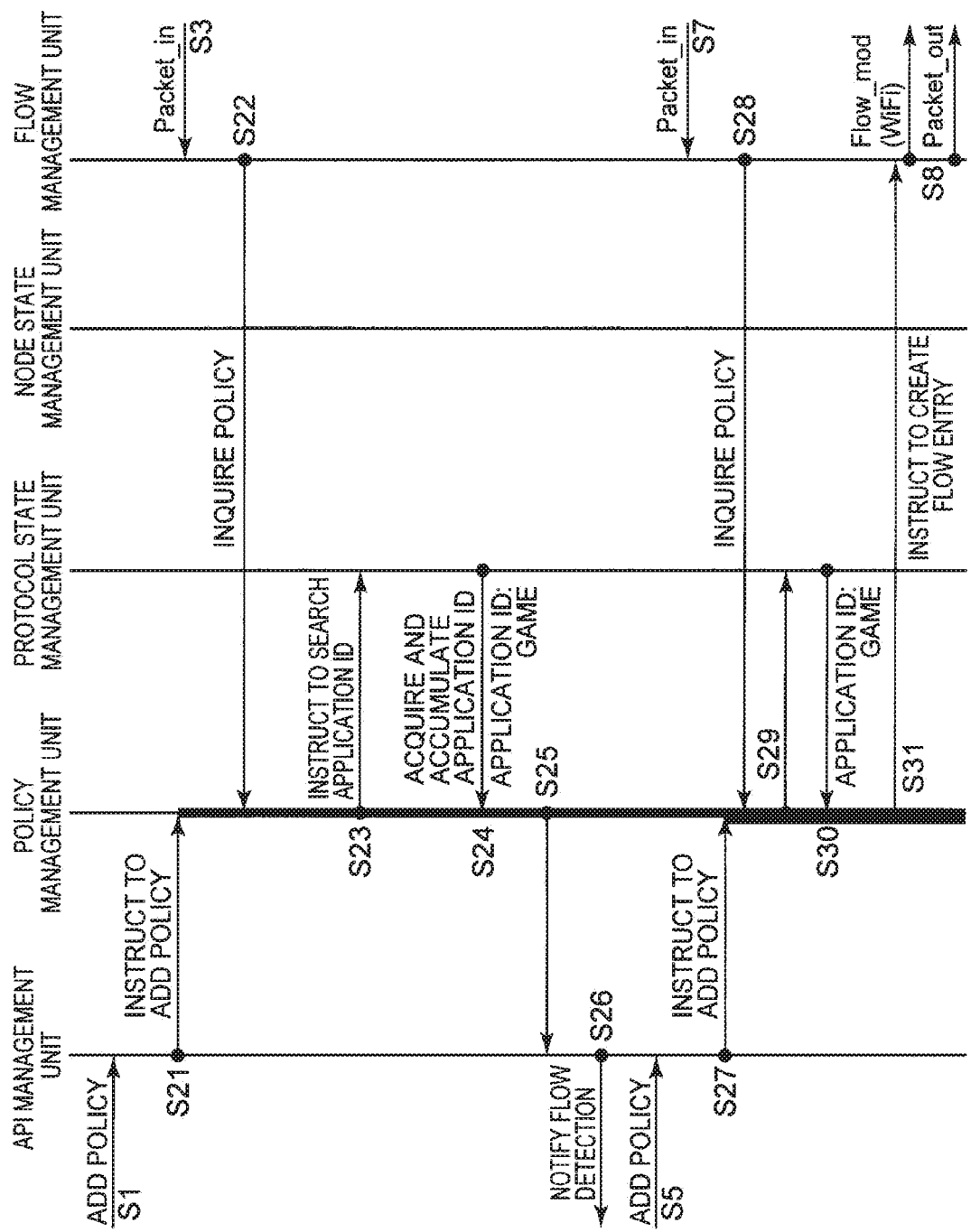
FIG. 7 It depicts a sequence diagram illustrating an exemplary processing progress of the OFC.

FIG. 7 is a sequence diagram illustrating an exemplary processing progress of the OFC 2. The processing progress of the OFC 2 in the operations illustrated in FIG. 6 will be described with reference to FIG. 7 and FIG. 3.

When the control application unit 3 sends an instruction to add a policy to the OFC 2 in step S1 (see FIG. 6), the API management unit 21 in the OFC 2 receives the instruction, and instructs the policy management unit 22 to add the policy (step S21). The policy management unit 22 holds the policy added in response to the instruction. The policy is a policy of instructing to make a flow detection notification previously described in step S1. The application ID of a game application is designated as a search key (see FIG. 2) in the policy.

Further, when the OFS 4 transmits "Packet_in" in step S3 (see FIG. 6), the flow management unit 24 receives the "Packet_in." Consequently, the flow management unit 24 receives a packet for which a corresponding flow entry is not present in the OFS 4. The packet has the transmission source of a game application. It is assumed that the packet is defined with its port number of "54321," for example. The flow management unit 24 sends the packet to the policy management unit 22, and requests the same to search a policy corresponding to the packet (step S22).

The policy management unit 22 detects the received "Packet_in" in response to the request (or detects a new flow). The policy management unit 22 then instructs the protocol state management unit 26 to search an application ID corresponding to the packet based on the flow information of the packet acquired in step S22 (step S23). That is, the policy management unit 22 instructs the protocol state management unit 26 to search the application ID of the transmission source application of the packet. In the present example, it is assumed that the policy management unit 22 designates the port number ("54321" in the present example) in the flow information as a key.

As described above, the protocol state management unit 26 holds the flow information of the packet and the application ID of the transmission source application of the packet. For example, the protocol state management unit 26 holds a correspondence among port number, process ID, UID, and application ID included in a packet. When receiving a search instruction from the policy management unit 22, the protocol state management unit 26 searches an application ID corresponding to the port number "54321" and notifies it to the policy management unit 22. The policy management unit 22 acquires and accumulates the searched application ID (step S24). The application ID is the application ID of a game application.

The policy management unit 22 searches a policy with the application ID and the destination of the packet acquired in step S22 as a search key. Then, the policy instructed to add in step S1 can be acquired. In the policy instructed to add in step S1, only the application ID is designated and the destination is not designated to be a wild card. The policy management unit 22 notifies the transmission source application (game application) of a new flow and the destination (game site) of the new flow to the control application unit 3 according to the policy. The operation corresponds to step S4 (flow detection notification) illustrated in FIG. 6. In the operation, the policy management unit 22 sends a notification to the API management unit 21 (step S25), and the API management unit 21 transmits the notification to the control application unit 3 (step S26).

It is assumed that the control application unit 3 creates a policy of transmitting the flow corresponding to the notified transmission source (game application) and destination (game site) via Wi-Fi in response to the flow detection notification, and instructs the OFC 2 to add the policy. The operation corresponds to step S5 illustrated in FIG. 6. Then, the API management unit 21 in the OFC 2 receives the instruction, and instructs the policy management unit 22 to add the policy (step S27).

Further, when the OFS 4 transmits "Packet_in" in step S7 (see FIG. 6), the flow management unit 24 receives the "Packet_in." Consequently, the flow management unit 24 receives a packet for which a corresponding flow entry is not present in the OFS 4. The flow management unit 24 sends the packet to the policy management unit 22 and requests the same to search a policy corresponding to the packet (step S28). Step S28 is the same operation as step S22.

The policy management unit 22 instructs the protocol state management unit 26 to search an application ID corresponding to the packet based on the flow information on the packet acquired in step S28 (step S29). The protocol state management unit 26 then searches the application ID in response to the instruction, and notifies it to the policy management unit 22. The policy management unit 22 acquires and accumulates the searched application ID (step S30). The operations in steps S29 and S30 are the same as the operations in steps S23 and S24.

In steps S29 and S30, the application ID of a game application can be acquired. Further, the destination of the packet sent to the policy management unit 22 in step S28 is a game site. The policy management unit 22 searches the policy acquired in step S5 with the information as a search key. Additionally, the policy (the policy with a search key of only application ID) acquired in step S1 can be searched. However, as described above, the priority of the policy acquired in step S5 is higher. Therefore, the policy management unit 22 searches the policy acquired in step S5. The policy describes therein an action of designating Wi-Fi as an access network. Therefore, the policy management unit 22 sends the action and the policy ID of the searched policy to the flow management unit 24 thereby to instruct the flow management unit 24 to create a flow entry (step S31).

The flow management unit 24 creates a flow entry defining that the flow of the packet received with "Packet_in" from the OFS 4 in step S7 is transmitted from the communication interface unit via Wi-Fi. The flow management unit 24 then instructs the OFS 4 to set the flow entry. The operation corresponds to step S8 illustrated in FIG. 6. At this time, the flow management unit 24 sends "Flow_mod (Wi-Fi)" and "Packet_out" to the OFS 4.

Figure 8:
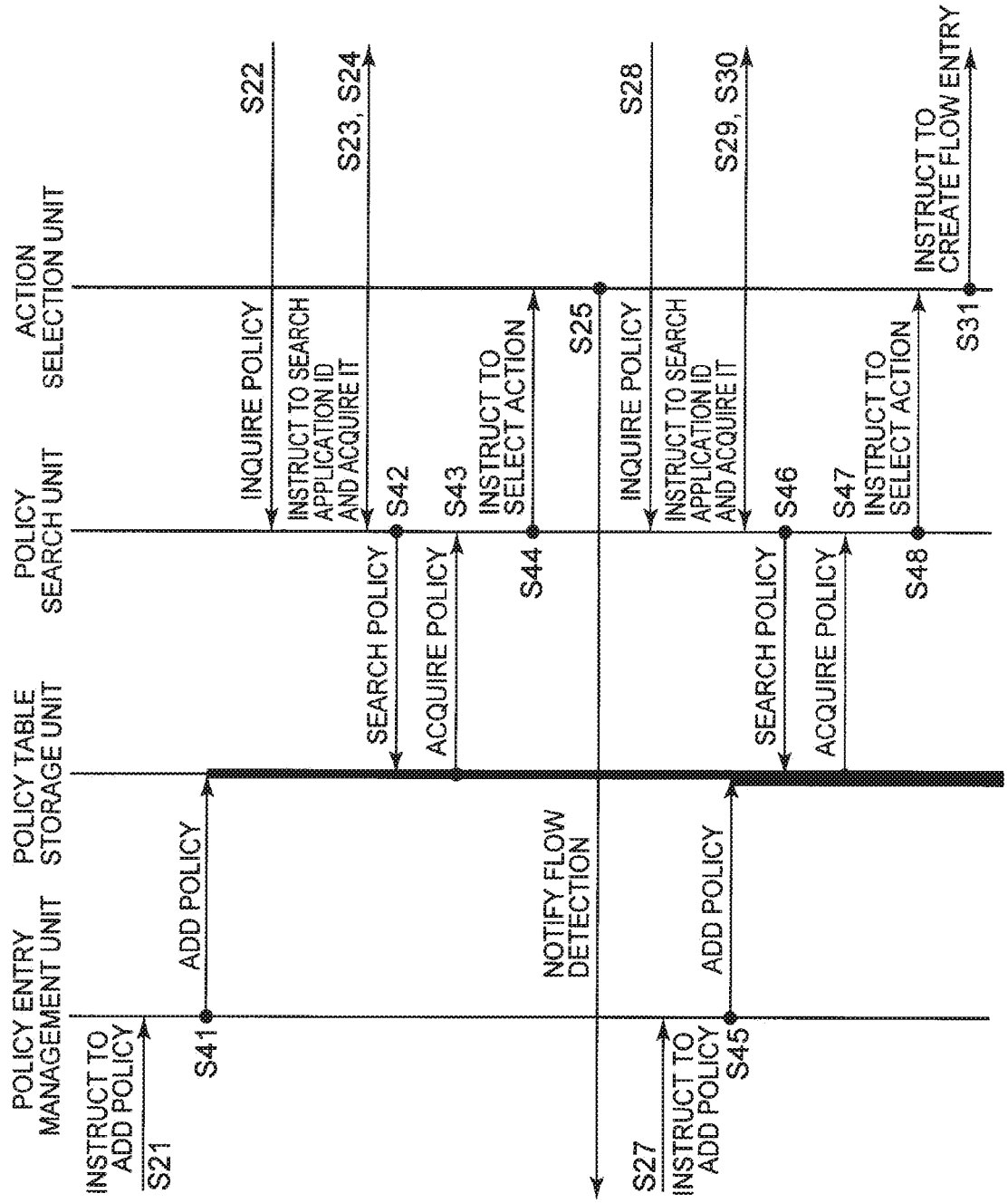
FIG. 8 It depicts a sequence diagram illustrating an exemplary processing progress of the policy management unit
FIG. 9 It depicts a block diagram illustrating main components in a terminal device according to the present invention.

FIG. 8 is a sequence diagram illustrating an exemplary processing progress of the policy management unit 22. The processing progress of the policy management unit 22 in the operations illustrated in FIG. 7 will be described with reference to FIG. 8 and FIG. 5.

When the API management unit 21 instructs the policy management unit 22 to add a policy in step S21 (see FIG. 7 and FIG. 8), the policy entry management unit 222 in the policy management unit 22 receives the instruction and stores a policy to be added in the policy table storage unit 221 (step S41). The policy is directed for instructing to make a flow detection notification described in step S1. Then, the application ID of a game application is designated as a search key in the policy.

Further, in step S22 (see FIG. 7 and FIG. 8), the flow management unit 24 sends a packet to the policy management unit 22 and requests the same to search a policy depending on the packet. The policy search unit 223 in the policy management unit 22 then receives the packet and the policy search request. The packet is received with "Packet_in" by the flow management unit 24, and the transmission source of the packet is a game application.

The policy search unit 223 instructs the protocol state management unit 26 to search an application ID corresponding to the packet based on the flow information on the packet acquired in step S22 (step S23), and acquires the application ID searched by the protocol state management unit 26 (step S24). The application ID is the application ID of a game application.

The policy search unit 223 then searches a policy from among the policies stored in the policy table storage unit 221 with the application ID acquired in step S24 and the destination of the packet acquired in step S22 as a search key (step S42). The policy search unit 223 then acquires the searched policy from the policy table storage unit 221 (step S43). The policy is stored in the policy table storage unit 221 in step S41.

The policy search unit 223 instructs the action selection unit 224 to select an action of the policy acquired in step S43 (step S44). The action selection unit 224 selects an action in the policy in response to the instruction. In the present example, the action of "notifying the transmission source application and the destination of a new flow to the control application unit 3" is defined by a flag. Therefore, the action selection unit 224 selects the action, and notifies the transmission source application (game application) of a new flow and the destination (game site) of the new flow to the control application unit 3 according to the action. At this time, the action selection unit 224 sends the notification to the API management unit 21 (step S25). The API management unit 21 then transmits the notification to the control application unit 3 (see step S26 illustrated in FIG. 7).

When the API management unit 21 instructs the policy management unit 22 to add a policy in step S27 (see FIG. 7 and FIG. 8), the policy entry management unit 222 receives the instruction and stores the policy to be added in the policy table storage unit 221 (step S45). The policy is described in step S5. That is, it is a policy of transmitting a flow with the transmission source of a game application and the destination of a game site via Wi-Fi.

Further, the flow management unit 24 sends a packet to the policy management unit 22 and requests the same to search a policy depending on the packet in step S28 (see FIG. 7 and FIG. 8). The policy search unit 223 in the policy management unit 22 then receives the packet and the policy search request.

The policy search unit 223 instructs the protocol state management unit 26 to search an application ID corresponding to the packet based on the flow information on the packet acquired in step S28 (step S29), and acquires the application ID searched by the protocol state management unit 26 (step S30). The application ID is the application ID of a game application.

The policy search unit 223 then searches a policy from among the policies stored in the policy table storage unit 221 with the application ID acquired in step S30 and the destination of the packet acquired in step S28 as a search key (step S46). The policy search unit 223 then acquires the searched policy from the policy table storage unit 221 (step S47). The policy is stored in the policy table storage unit 221 in step S45.

The policy search unit 223 instructs the action selection unit 224 to select an action of the policy acquired in step S47 (step S48). The action selection unit 224 selects an action in the policy in response to the instruction. The policy describes therein an action of designating Wi-Fi as an access network. Therefore, the action selection unit 224 transmits the action and the policy ID of the policy to the flow management unit 24, and instructs the flow management unit 24 to create a flow entry (step S31). The operations of the flow management unit 24 receiving the instruction has been described with reference to FIG. 7, and thus the description thereof will be omitted herein.

According to the present invention, when detecting a new flow, the OFC 2 transmits the notification that it detected the new flow (flow detection notification) to the control application unit 3. The control application unit 3 then determines whether to permit the new flow to be communicated. Therefore, according to the present invention, it is possible to prevent user-unintended communication from being made.

Further, the flow detection notification includes information on the transmission source application or the destination of the flow. Thereby, the user can easily determine whether an unintended communication flow is caused.

According to the above exemplary embodiment, a flow of which detection is to be notified is defined according to a policy instructed to add by the control application unit 3 in step S1 (see FIG. 6). Therefore, the control application unit 3 does not need to receive a flow detection notification for all the detected new flows, and can receive a flow detection notification only when a new flow meeting a designated condition is caused.

According to the above exemplary embodiment, the OFC 2 controls the OFS 4 according to OpenFlow. Therefore, the OFC 2 can widely control the operations of the OFS 4. In particular, according to the present exemplary embodiment, the control application unit 3 gives a policy to the OFC 2, and the OFC 2 can widely control the operations of the OFS 4 according to the policy.

According to the above exemplary embodiment, the control application unit 3 adds the policy of designating a flow of which detection is to be notified to the OFC 2 in step S1. The policy may not be employed. In this case, the OFC 2 may transmit a flow detection notification to the control application unit 3 each time it detects a new flow. Also with the structure, it is possible to prevent user-unintended communication from being made.

The above exemplary embodiment has been described assuming that when the control application unit 3 adds a policy of designating a flow of which detection is to be notified to the OFC 2 in step S1, the transmission source application ID of the flow is described in the policy. That is, the description has been made assuming that a flow of which detection is to be notified is designated by the transmission source application ID. The control application unit 3 may designate a flow of which detection is to be notified in other way. For example, the control application unit 3 may designate a flow of which detection is to be notified by the destination of the flow. In this case, the control application unit 3 may describe the destination to be designated as flow identification information in the search key in the policy. Further, the control application unit 3 designates both the application ID of the flow and the destination of the flow thereby to define such that a flow detection notification is transmitted when a new flow matching with the designated application ID and destination is detected.

Figure 9:
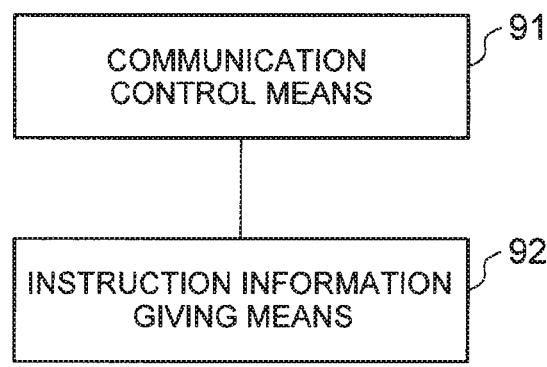

Main components of the present invention will be described below. FIG. 9 is a block diagram illustrating main components in a terminal device according to the present invention. The terminal device according to the present invention includes a communication control means 91 and an instruction information giving means 92.

The communication control means 91 (the OFC 2, for example) controls a packet transfer means (the OFS 4, for example) for transmitting a packet.

The instruction information giving means 92 (the control application unit 3, for example) gives instruction information (such as policy) indicating an instruction for the communication control means 91 to the communication control means 91.

When detecting a new flow, the communication control means 91 sends a flow detection notification that it detected the new flow to the instruction information giving means 92.

The instruction information giving means 92 determines whether to permit the flow to be communicated when receiving the flow detection notification. When determining to permit communication, the instruction information giving means 92 then gives instruction information for instructing to transmit a packet of the flow in a path as an access network designated by the instruction information giving means 92 to the communication control means 91.

With the structure, it is possible to prevent user-unintended communication from being made.

There may be configured such that after the communication control means 91 is given instruction information for instructing to transmit a packet of a flow in a path as an access network designated by the instruction information giving means 92, the packet transfer means is controlled to transmit the packet of the flow from a communication interface unit corresponding to the access network.

There may be configured such that the communication control means 91 sends information on transmission source application software of a flow and the destination of the flow as a flow detection notification to the instruction information giving means 92.

There may be configured such that when the instruction information giving means 92 gives instruction information for designating a flow of which detection is to be notified to the communication control means 91 and the communication control means 91 detects a new flow designated by the instruction information, the flow detection notification is sent to the instruction information giving means 92.

There may be configured such that the instruction information giving means 92 designates any one of or both the transmission source application software of a flow and the destination of the flow thereby to give instruction information for designating a flow of which detection is to be notified to the communication control means 91.

There may be configured such that the communication control means 91 controls the packet transfer means according to OpenFlow.

The present invention has been described above with reference to the exemplary embodiment, but the present invention is not limited to the exemplary embodiment. The structure or details of the present invention may be variously changed within the scope of the present invention understandable to those skilled in the art.

The present application claims the priority based on Japanese Patent Application No. 2013-214024 filed on Oct. 11, 2013, the disclosure of which is all incorporated herein by reference.

INDUSTRIAL APPLICABILITY

The present invention is suitably applicable to terminal devices capable of making communication with the outside.

REFERENCE SIGNS LIST

1 Terminal device
2 OFC (Communication control management unit)
3 Control application unit
4 OFS (Packet transfer unit)
5 Protocol processing unit
6 Application unit
7a to 7n Communication interface unit
21 API management unit
22 Policy management unit
23 Statistical information management unit
24 Flow management unit
25 Node state management unit
26 Protocol state management unit
221 Policy table storage unit
222 Policy entry management unit
223 Policy search unit
224 Action selection unit

The invention claimed is:

1. A terminal device comprising:
a communication control unit implemented by a processor and which controls a packet transfer unit implemented by the processor and which transmits a packet; and
an instruction information giving unit implemented by the processor and which gives instruction information indicating an instruction for the communication control unit to the communication control unit,
wherein
the communication control unit sends a flow detection notification that it detected a new flow to the instruction information giving unit when detecting the new flow,
the instruction information giving unit determines whether to permit the flow to be communicated when receiving the flow detection notification, and when determining to permit communication, gives instruction information for instructing to transmit a packet of the flow in a path as an access network designated by the instruction information giving unit to the communication control unit,
the communication control unit sends information on an application ID identifying an application software as a transmission source of the flow, for exchanging traffic to be controlled within the terminal device and a destination of the flow as the flow detection notification to the instruction information giving unit, wherein the application software is held in the terminal device, and
the instruction information giving unit determines whether to permit the flow to be communicated, based on the application ID and the destination of the flow.

2. The terminal device according to claim 1,
wherein after being given the instruction information for instructing to transmit the packet of the flow in the path as the access network designated by the instruction information giving unit, the communication control unit controls the packet transfer unit to transmit the packet of the flow from a communication interface unit corresponding to the access network.

3. The terminal device according to claim 1,
wherein the instruction information giving unit gives instruction information for designating a flow of which detection is to be notified to the communication control unit, and
the communication control unit sends the flow detection notification to the instruction information giving unit when detecting the new flow designated by the instruction information.

4. The terminal device according to claim 3,
wherein the instruction information giving unit gives instruction information for designating the flow of which detection is to be notified to the communication control unit by designating either one of or both the application ID and the destination of the flow.

5. The terminal device according to claim 1,
wherein the communication control unit controls the packet transfer unit according to OpenFlow.

6. A terminal-device control method comprising:
by a communication control unit implemented by a processor, controlling a packet transfer unit implemented by the processor and which transmits a packet;
by an instruction information giving unit implemented by the processor, giving instruction information indicating an instruction for the communication control unit to the communication control unit;
by the communication control unit, sending a flow detection notification that it detected a new flow to the instruction information giving unit when detecting the new flow; and
by the instruction information giving unit, determining whether to permit the flow to be communicated when receiving the flow detection notification, and when determining to permit communication, giving instruction information for instructing to transmit a packet of the flow in a path as an access network designated by the instruction information giving unit to the communication control unit,
wherein
the communication control unit sends information on an application ID identifying an application software as a transmission source of the flow, for exchanging traffic to be controlled within a terminal device and a destination of the flow as the flow detection notification to the instruction information giving unit, wherein the application software is held in the terminal device, and
the instruction information giving unit determines whether to permit the flow to be communicated, based on the application ID and the destination of the flow.

7. The terminal-device control method according to claim 6,
wherein after being given the instruction information for instructing to transmit the packet of the flow in the path as the access network designated by the instruction information giving unit, the communication control unit controls the packet transfer unit to transmit the packet of the flow from a communication interface unit corresponding to the access network.

8. A non-transitory computer readable recording medium in which a terminal-device control program is recorded, the program is mounted on a computer used as a terminal device comprising a communication control unit implemented by a processor and which controls a packet transfer unit implemented by the processor and which transmits a packet and an instruction information giving unit implemented by the processor and which gives instruction information indicating an instruction for the communication control unit to the communication control unit, the program causing the computer to perform:
a flow detection notification processing of, when the communication control unit detects a new flow, sending a flow detection notification that the new flow is detected to the instruction information giving unit; and
an instruction information giving processing of, when the instruction information giving unit determines whether to permit the flow to be communicated when receiving the flow detection notification, and determines to permit communication, giving instruction information for instructing to transmit a packet of the flow in a path as an access network designated by the instruction information giving unit to the communication control unit,
wherein
in the flow detection notification processing, information on an application ID identifying an application software as a transmission source of the flow, for exchanging traffic to be controlled within the terminal device and a destination of the flow as the flow detection notification are sent to the instruction information giving unit, wherein the application software is held in the terminal device, and
in the instruction information giving processing, it is determined whether to permit the flow to be communicated, based on the application ID and the destination of the flow.

9. The non-transitory computer readable recording medium in which the terminal-device control program is recorded according to claim 8, the program causing a computer to perform:
a control processing of, after the communication control unit is given the instruction information for instructing to transmit the packet of the flow in the path as the access network designated by the instruction information giving unit, controlling the packet transfer unit to transmit the packet of the flow from a communication interface unit corresponding to the access network.

* * * * *